United States Patent
Choi et al.

(10) Patent No.: US 12,308,666 B2
(45) Date of Patent: May 20, 2025

(54) ELECTRONIC DEVICE AND METHOD OF OUTPUTTING POWER CONTROL SIGNAL FOR WIRELESS POWER RECEPTION IN THE ELECTRONIC DEVICE

(71) Applicant: Samsung Electronics Co., Ltd., Suwon-si (KR)

(72) Inventors: Jinsik Choi, Suwon-si (KR); Baewon Park, Suwon-si (KR); Seungshik Shin, Suwon-si (KR); Sangmin Ye, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 675 days.

(21) Appl. No.: 17/707,310

(22) Filed: Mar. 29, 2022

(65) Prior Publication Data
US 2023/0006482 A1 Jan. 5, 2023

Related U.S. Application Data

(63) Continuation of application No. PCT/KR2022/003394, filed on Mar. 10, 2022.

(30) Foreign Application Priority Data

Jul. 5, 2021 (KR) .................. 10-2021-0088033

(51) Int. Cl.
*H02J 50/80* (2016.01)
*H02J 7/00* (2006.01)
(Continued)

(52) U.S. Cl.
CPC .......... *H02J 50/80* (2016.02); *H02J 7/00034* (2020.01); *H02J 7/007* (2013.01); *H02J 7/04* (2013.01); *H02J 50/10* (2016.02)

(58) Field of Classification Search
CPC ...................................................... H02J 50/80
(Continued)

(56) References Cited

U.S. PATENT DOCUMENTS 10,205,487 B1    2/2019   Ho et al.
10,236,719 B2 *   3/2019   Jung .................. H02J 50/402
(Continued)

FOREIGN PATENT DOCUMENTS

JP        2018-148617 A    9/2018
KR   10-2015-0028133 A    3/2015
(Continued)

OTHER PUBLICATIONS

Extended European Search Report dated Mar. 13, 2023, issued in a European Application No. 22711429.5.
(Continued)

*Primary Examiner* — Edward Tso
*Assistant Examiner* — Ahmed H Omar
(74) *Attorney, Agent, or Firm* — Jefferson IP Law, LLP

(57) ABSTRACT

An electronic device is provided. The electronic device includes a battery, at least one coil, a wireless power transmission/reception circuit electrically coupled to the at least one coil, a charging circuit electrically coupled between the wireless power transmission/reception circuit and the battery, and a processor. The processor may be configured to detect an external electronic device capable of wireless power transmission by using the wireless power transmission/reception circuit), identify a magnitude of power to be received at the external electronic device, control the wireless power transmission/reception circuit to output a first control error packet (CEP) signal having a first power magnitude which is fixed, based on the magnitude of the power being less than a specified power magnitude, and control the wireless power transmission/reception circuit to output a second CEP signal having a variable power magnitude based on the first power magnitude and a second power magnitude, based on the magnitude of the power being equal to or greater than the specified power magnitude.

20 Claims, 11 Drawing Sheets

(51) Int. Cl.
*H02J 7/04* (2006.01)
*H02J 50/10* (2016.01)

(58) Field of Classification Search
USPC .......................................... 320/108
See application file for complete search history.

(56) References Cited

U.S. PATENT DOCUMENTS

| | | |
|---|---|---|
| 2016/0172895 A1* | 6/2016 | Lee .................. H02J 7/04 320/108 |
| 2017/0117741 A1 | 4/2017 | Lee et al. |
| 2018/0254670 A1 | 9/2018 | Tsukamoto |
| 2019/0305675 A1 | 10/2019 | Chen et al. |
| 2020/0366137 A1 | 11/2020 | Park et al. |
| 2021/0036558 A1 | 2/2021 | Woo et al. |

FOREIGN PATENT DOCUMENTS

| | | |
|---|---|---|
| KR | 10-2018-0062775 A | 6/2018 |
| KR | 10-2018-0102036 A | 9/2018 |
| KR | 10-2019-0105480 A | 9/2019 |
| KR | 10-2020-0115630 A | 10/2020 |
| KR | 10-2021-0015467 A | 2/2021 |
| WO | 2010/060062 A1 | 5/2010 |

OTHER PUBLICATIONS

International Search Report dated Jun. 17, 2022, issued in International Application No. PCT/KR2022/003394.

\* cited by examiner

ELECTRONIC DEVICE AND METHOD OF OUTPUTTING POWER CONTROL SIGNAL FOR WIRELESS POWER RECEPTION IN THE ELECTRONIC DEVICE

CROSS-REFERENCE TO RELATED APPLICATION(S)

This application is a continuation application, claiming priority under § 365(c), of an International application No. PCT/KR2022/003394, filed on Mar. 10, 2022, which is based on and claims the benefit of a Korean patent application number 10-2021-0088033, filed on Jul. 5, 2021, in the Korean Intellectual Property Office, the disclosure of which is incorporated by reference herein in its entirety.

TECHNICAL FIELD

The disclosure relates to an electronic device and a method of outputting a power control signal for wireless power reception in the electronic device.

BACKGROUND ART

Along with the development of wireless power transfer technology, many electronic devices have recently used the wireless power transfer technology for wireless charging or contactless charging. Wireless power transfer is a technology of converting electric energy into an electromagnetic wave having a frequency and wirelessly transferring energy by a load without a transmission line. The wireless power transfer technology may be a technology of transferring power wirelessly from a power transmission device to a power reception device without a wired connection between the power reception device and the power transmission device, and charging the battery of the power reception device with the power. The wireless power transfer technology may include a magnetic induction method and a magnetic resonance method, and many other wireless power transfer technologies are available.

For example, a magnetic inductive wireless power transmission system transmits power by using a magnetic field induced in a coil. Induced current flows in a receiving coil by a magnetic field generated from current flowing in a transmitting coil, and energy is supplied by a load. Representative magnetic induction standards include wireless power consortium (WPC) and power matters alliance (PMA). A specified frequency band may be used for power transmission, such as 110 to 205 kHz in WPC, and 227 to 357 kHz and 118 to 153 kHz in PMA.

The above information is presented as background information only to assist with an understanding of the disclosure. No determination has been made, and no assertion is made, as to whether any of the above might be applicable as prior art with regard to the disclosure.

DISCLOSURE

Technical Problem

According to WPC, an electronic device (e.g., a wireless power reception device) may wirelessly receive power from an external electronic device (e.g., a wireless power transmission device) to perform charging. The electronic device may output a wireless power control signal for controlling power to be wirelessly transmitted from the external electronic device during wireless charging. For example, the wireless power control signal may be a control error packet (CEP) signal. The external electronic device may receive the CEP signal from the electronic device and control power to be wirelessly transmitted.

Typically, the CEP signal may have a specified frequency-based waveform. When the electronic device outputs the CEP signal, a circuit (e.g., a capacitor and/or a printed circuit board (PCB)) may be shaken due to the waveform of the CEP signal, thereby causing noise in the electronic device. In addition, upon receipt of the CEP signal, the external electronic device may experience vibration of its internal circuit, which causes noise (e.g., audible noise). The audible noise generated in the internal circuit of each of the electronic device and the external electronic device may cause inconvenience to a user. The vibration may also lead to damage of the electronic device and/or its components.

Aspects of the disclosure are to address at least the above-mentioned problems and/or disadvantages and to provide at least the advantages described below. Accordingly, an aspect of the disclosure is to provide an electronic device capable of reducing noise by minimizing or reducing vibration of circuits in the electronic device and an external electronic device, and a method of outputting a power control signal for wireless power reception in the electronic device.

Another aspect of the disclosure is to provide an electronic device capable of reducing noise (e.g., audible noise) caused by vibration of circuits in the electronic device and an external electronic device without decreasing or without a substantial decrease in the communication stability of wireless power by adjusting the waveform of a CEP signal to a waveform that reduces circuit vibration in the electronic device and the external electronic device, based on the magnitude of wireless power transmitted and received between the electronic device and the external electronic device, when the electronic device outputs the CEP signal, and a method of outputting a power control signal for wireless power reception in the electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a battery, at least one coil, a wireless power transmission/reception circuit electrically coupled to the at least one coil, a charging circuit electrically coupled between the wireless power transmission/reception circuit and the battery, and a processor. The processor may be configured to detect an external electronic device capable of receiving power transmitted wirelessly through the wireless power transmission/reception circuit, identify a magnitude of power to be received at the external electronic device, control the wireless power transmission/reception circuit to output a first control error packet (CEP) signal having a first power magnitude which is fixed, based on the magnitude of the power being less than a specified power magnitude, and control the wireless power transmission/reception circuit to output a second CEP signal having a variable power magnitude based on the first power magnitude and a second power magnitude, based on the magnitude of the power being equal to or greater than the specified power magnitude. Other embodiments are also possible.

In accordance with another aspect of the disclosure, a method of outputting a power control signal for wireless power reception in an electronic device is provided. The method includes detecting an external electronic device capable of receiving power transmitted wirelessly through a wireless power transmission/reception circuit, identifying a magnitude of power to be received from the external electronic device, outputting a first CEP signal having a first power magnitude which is fixed, based on the magnitude of the power being less than a specified power magnitude, and outputting a second CEP signal having a variable power magnitude based on the first power magnitude and the second power magnitude, based on the magnitude of the power being equal to or greater than the specified power magnitude.

According to various embodiments of the disclosure, a non-volatile storage medium may store instructions which are configured to, when executed by at least one processor, cause the at least one processor to perform at least one operation. The at least one operation may include detecting an external electronic device capable of receiving power transmitted wirelessly through a wireless power transmission/reception circuit, identifying a magnitude of power to be received from the external electronic device, outputting a first CEP signal having a fixed first power magnitude, based on the magnitude of the power being less than a specified power magnitude, and outputting a second CEP signal having a variable power magnitude based on the first power magnitude and the second power magnitude, based on the magnitude of the power being equal to or greater than the specified power magnitude.

Advantageous Effects

According to various embodiments of the disclosure, noise may be reduced by minimizing vibration of circuits (e.g., a capacitor and/or a printed circuit board (PCB) in an electronic device and an external electronic device during wireless power transmission and reception between the electronic device and the external electronic device.

According to various embodiments of the disclosure, when an electronic device outputs a CEP signal, noise (e.g., audible noise) caused by vibration of circuits in the electronic device and an external electronic device may be reduced without decreasing or substantially decreasing stability during wireless power transmission and reception by adjusting the waveform of the CEP signal to a waveform that reduces circuit vibration in the electronic device and the external electronic device, based on the magnitude of wireless power transmitted and received between the electronic device and the external electronic device.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms as used in the disclosure are provided to merely describe specific embodiments, not intended to limit the scope of the disclosure. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding embodiments of the disclosure under circumstances.

Figure 1:
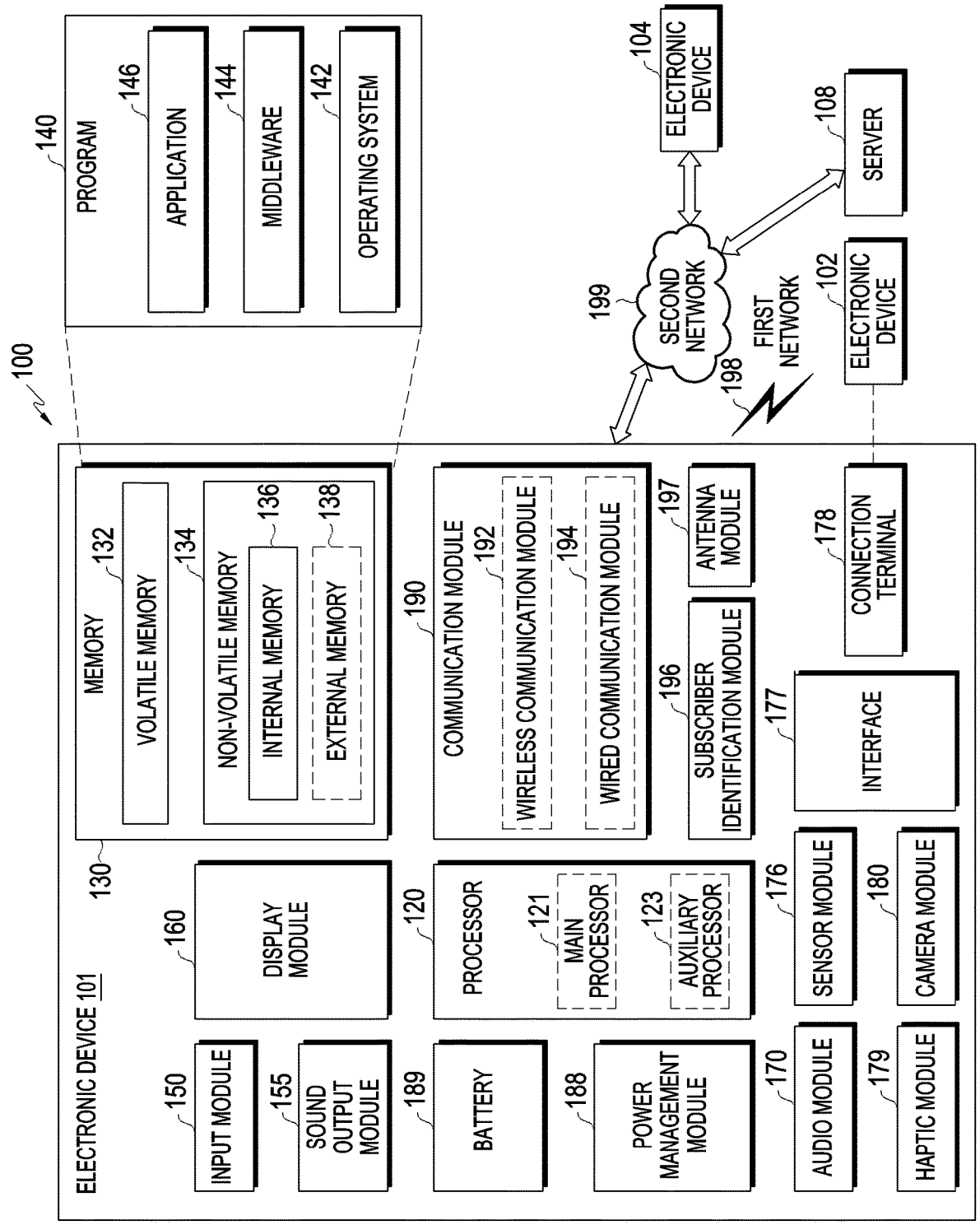
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., while executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a millimeter (mm) Wave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
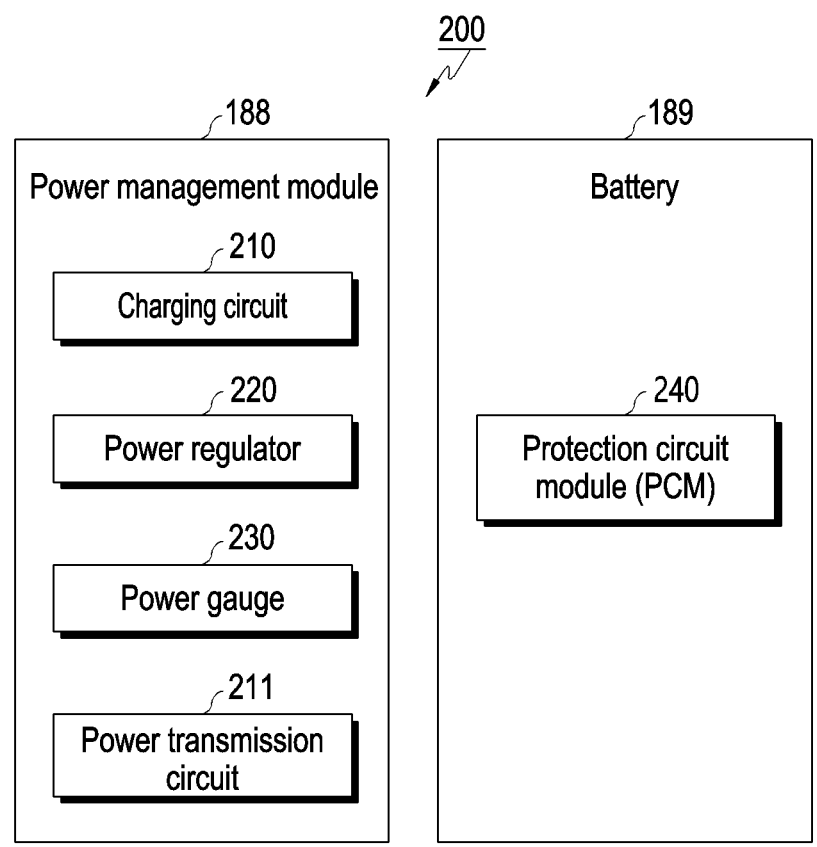
FIG. 2 is a block diagram illustrating a power management module and a battery according to an embodiment of the disclosure.

FIG. 2 is a block diagram 200 illustrating the power management module 188 and the battery 189 according to an embodiment of the disclosure.

Referring to FIG. 2, the power management module 188 may include a charging circuit 210, a power regulator 220, or a power gauge 230 (or a fuel gauge). The charging circuit 210 may charge the battery 189 with power supplied from an external power source to the electronic device 101. According to an embodiment of the disclosure, the charging circuit 210 may select a charging method (e.g., normal charging or fast charging) based on at least some of the type of an external power source (e.g., a power adapter, a USB, or wireless charging), the magnitude (e.g., about 20 watts or more) of power available from the external power source, or the property of the battery 189, and charge the battery 189 in the selected charging method. The external power source may be connected to the electronic device 101, for example, wiredly through the connecting terminal 178 or wirelessly through the antenna module 197. For example, the charging circuit 210 may charge the battery 189 with power wirelessly supplied from the external electronic device 102.

The power regulator 220 may generate a plurality of powers having different voltage levels or current levels by adjusting, for example, the voltage level or current level of the power supplied from the external power source or the battery 189. The power regulator 220 may adjust the power of the external power source or the battery 189 to a voltage level or current level suitable for each of some of the components included in the electronic device 101. According to an embodiment of the disclosure, the power regulator 220 may be implemented in the form of a low drop out (LDO) regulator or a switching regulator. The power gauge 230 may measure use state information about the battery 189 (e.g., the capacity, number of charges and discharges, voltage, or temperature of the battery 189).

The power management module 188 may determine charge state information (e.g., a lifetime, overvoltage, low voltage, overcurrent, overcharge, overheat, short circuit, or swelling) related to charging of the battery 189 based at least part of the measured use state information, for example, by using the charging circuit 210, the power regulator 220, or the power gauge 230. The power management module 188 may determine whether the battery 189 is normal or abnormal based at least part of the determined charge state information. When the state of the battery 189 is determined to be abnormal, the power management module 188 may adjust charging of the battery 189 (e.g., reduce a charge current or voltage or stop the charging). According to an embodiment of the disclosure, at least some of the functions of the power management module 188 may be performed by an external control device (e.g., the processor 120).

According to an embodiment of the disclosure, the battery 189 may include a protection circuit module (PCM) 240. The PCM 240 may perform one or more of various functions (e.g., a pre-blocking function) to prevent performance degradation or loss of the battery 189. The PCM 240 may be additionally or alternatively configured as at least a part of a battery management system (BMS) capable of performing various functions including cell balancing, battery capacity measurement, measurement of the number of charges/discharges, temperature measurement, or voltage measurement.

According to an embodiment of the disclosure, at least part of the use state information or the charge state information about the battery 189 may be measured by using a corresponding sensor (e.g., a temperature sensor in the sensor module 176), the power gauge 230, or the power management module 188. According to an embodiment of the disclosure, the corresponding sensor (e.g., the temperature sensor) of the sensor module 176 may be included as a part of the PCM 240 or may be disposed near to the battery 189, as a separate device.

According to an embodiment of the disclosure, the power management module 188 may further include a power transmission circuit 211. The power transmission circuit 211 may include a power adapter that receives power from the battery 189 and appropriately converts the voltage of the input power, a power generation circuit that generates power, and/or a matching circuit that wirelessly transmits the generated power to the external electronic device (e.g., the electronic device 102 of FIG. 1). The power transmission circuit 211 may transmit the generated power to the external electronic device by maximizing efficiency between a transmission coil and a reception coil of the external electronic device through the matching circuit.

According to various embodiments of the disclosure, the external electronic device 102 may include the same components as included in the electronic device 101, and may wirelessly supply power to the electronic device 101.

Figure 3:
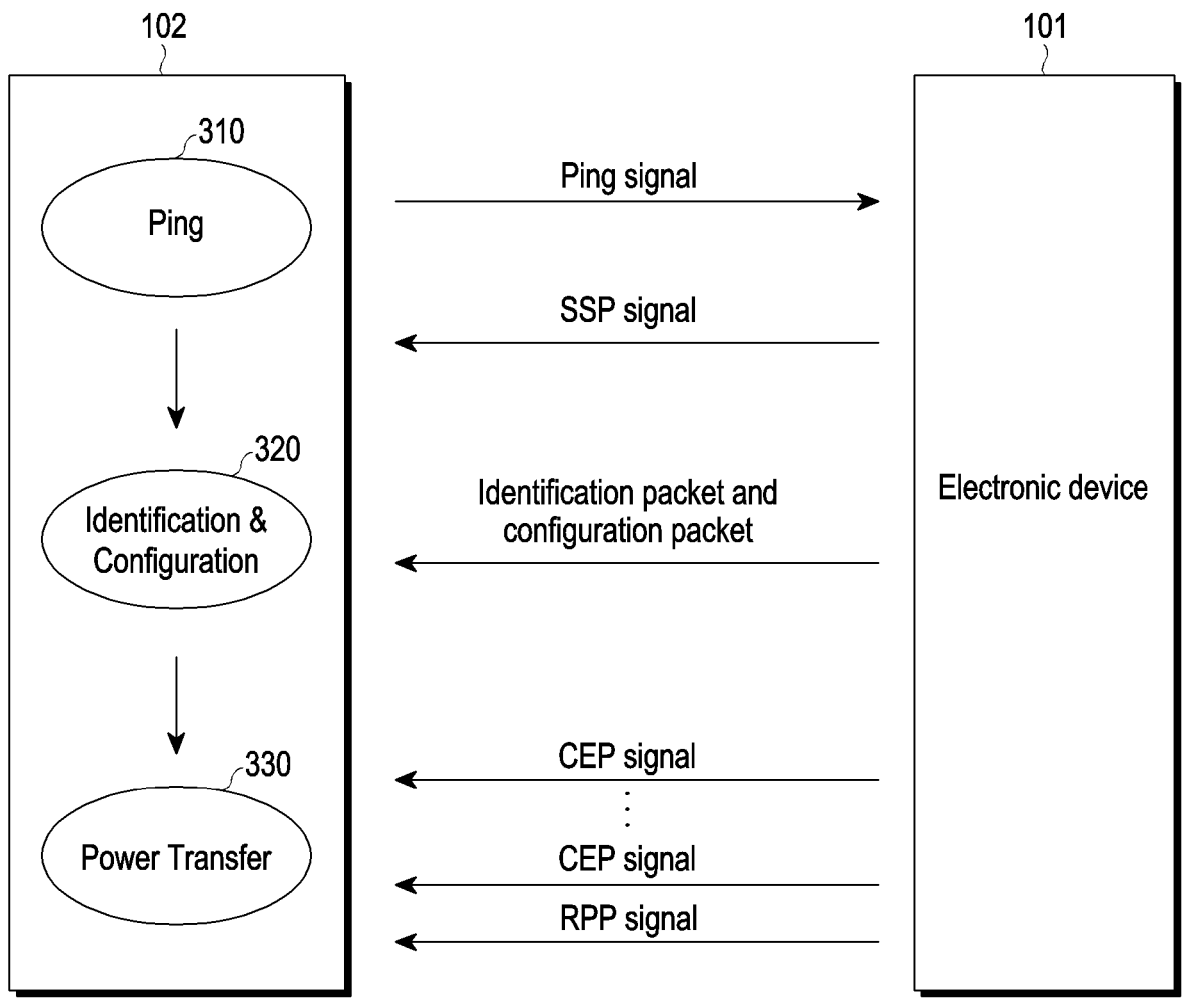
FIG. 3 is a diagram illustrating a wireless charging operation between an electronic device and an external electronic device according to an embodiment of the disclosure.

FIG. 3 is a diagram illustrating a wireless charging operation between an electronic device and an external electronic device according to an embodiment of the disclosure.

Referring to FIG. 3, the electronic device (e.g., a wireless power reception device) 101 according to an embodiment may receive a ping signal which is output from the external electronic device (e.g., a wireless power transmission device) 102 in correspondence with a ping phase 310. For example, the ping signal may include a digital ping signal or an analog ping signal.

Upon receipt of the ping signal, the electronic device 101 according to an embodiment may transmit a signal strength packet (SSP) signal for starting a wireless charging protocol to the external electronic device 102 in response to the ping signal. The SSP according to an embodiment may include a value indicating a degree of magnetic induction coupling between conductive coils of the electronic device 101 and the external electronic device 102. The electronic device 101 and the external electronic device 102 according to an embodiment may enter an identification & configuration phase 320 based on the reception of the SSP signal at the external electronic device 102.

The electronic device 101 according to an embodiment may transmit an identification packet and a configuration packet to the external electronic device 102 in the identification & configuration phase 320. For example, the identification packet may include a WPC version, a power receiver manufacturer code (PRMC), and/or a product code, and the configuration packet may include a power class and/or a maximum power. The external electronic device 102 may identify the electronic device 101 based on the identification packet and the configuration packet and perform wireless power transmission configuration. After the identification & configuration phase 320, the electronic device 101 and the external electronic device 102 may enter a power transfer phase 330.

The electronic device 101 according to an embodiment may transmit at least one control error packet (CEP) signal and at least one received power packet (RPP) signal to the external electronic device 102 in the power transfer phase 330. The CEP signal may include information requesting an increase or decrease in power to be transmitted by the external electronic device 102. The RPP signal may include information indicating the magnitude of power received at the electronic device 101. The external electronic device 102 may adjust power transmitted to the electronic device 101 based on the CEP signal and/or the RPP signal.

According to an embodiment of the disclosure, the electronic device 101 may transmit a CEP signal having a specified power magnitude at specified time intervals (e.g., at intervals of any one of about 53 ms to 150 ms) or based on a specified frequency (e.g., 2 KHz (±4%)). When the external electronic device 102 according to an embodiment fails to receive the CEP signal during a signal waiting time i.e. a CEP signal waiting time (e.g., 1.8 sec), the external electronic device 102 may discontinue the power transmission, identifying that the electronic device 101 has been removed from the external electronic device 102. Upon receipt of the CEP signal, the external electronic device 102 may increase or decrease power to be transmitted to the electronic device 101 based on the information included in the CEP signal.

When the electronic device 101 according to an embodiment transmits the CEP signal, a capacitor (e.g., a multilayer ceramic capacitor (MLCC)) in the electronic device 101 may be repeatedly contracted and expanded due to the power magnitude and frequency (e.g., 2 KHz (±4%)) of the CEP signal. The contraction and expansion of the capacitor in the electronic device 101 may vibrate (or shake) a printed circuit board (PCB). The PCB vibration (or shaking) may cause noise (e.g., audible noise) in the electronic device 101. Due to the noise generated in the electronic device 101, a user may feel inconvenience or mistake the noise for breakdown of the electronic device 101.

In addition, when the external electronic device 102 receives the CEP signal, a capacitor (e.g., MLCC) in the external electronic device 102 may be repeatedly contracted and expanded due to the frequency of the received CEP signal, thereby causing PCB vibration. The PCB vibration may generate noise in the external electronic device 102. Due to the noise generated in the external electronic device 102, the user may feel inconvenience or mistake the noise for breakdown of the external electronic device 102.

Figure 4A:
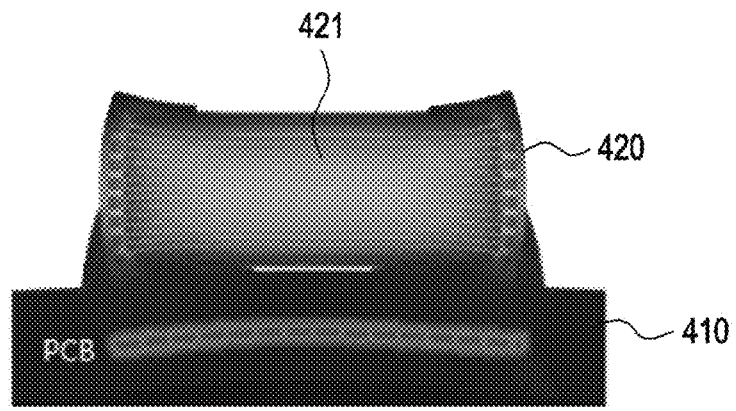
FIG. 4A is a diagram illustrating contraction of a multilayer ceramic capacitor (MLCC) based on a control error packet (CEP) signal according to an embodiment of the disclosure.
Figure 4B:
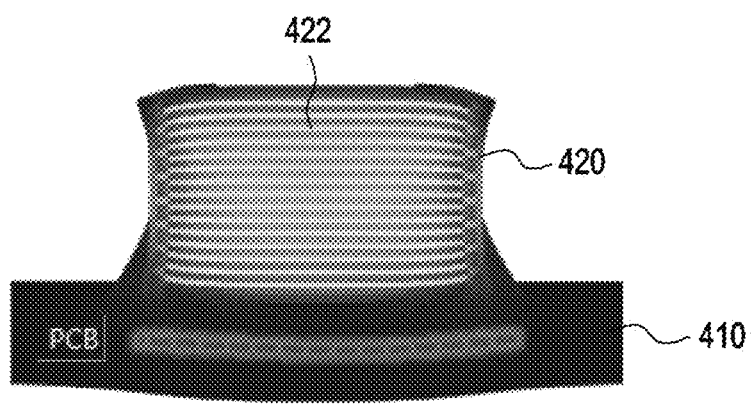
FIG. 4B is a diagram illustrating expansion of an MLCC based on a CEP signal according to an embodiment of the disclosure.

FIG. 4A is a diagram illustrating contraction of an MLCC based on a CEP signal according to an embodiment of the disclosure, and FIG. 4B is a diagram illustrating expansion of an MLCC based on a CEP signal according to an embodiment of the disclosure.

Referring to FIGS. 4A and 4B, the electronic device 101 and/or the external electronic device 102 according to an embodiment may include a PCB 410 therein and at least one MLCC 420 disposed on the PCB 410. For example, the MLCC 420 may include many layers as thin as possible in an inner space of a small size (e.g., about 0.06 mm) and a small thickness (e.g., about 0.3 mm) For example, the MLCC 420 may temporarily charge electric charges and discharge a predetermined amount of electric charges at each time, thereby controlling current to constantly flow in a circuit and removing noise to prevent electromagnetic interference between components.

The MLCC 420 according to an embodiment may repeatedly alternate between a contraction state 421 in which electric charges are discharged as illustrated in FIG. 4A and an expansion state 422 in which electric charges are charged as illustrated in FIG. 4B due to a CEP signal of a specified frequency. The resulting bending and unbending of the PCB 410 on which the MLCC 420 is disposed may cause PCB vibration.

For example, when the power magnitude (e.g., amplitude) of the CEP signal is small, the difference between the contraction state 421 and the expansion state 422 of the MLCC 420 may be small, thus causing weak vibration of the PCB 410, whereas when the power magnitude (e.g., amplitude) of the CEP signal is large, the difference between the contraction state 421 and the expansion state 422 of the PCB 410 may be large, thus causing strong vibration of the PCB 410. To reduce the vibration of the PCB 410, the power magnitude of the CEP signal output from the electronic device 101 may need to be lowered. However, when the power magnitude of the CEP signal is lowered, the low-power CEP signal output from the electronic device 101 may not be received (or recognized) by the external electronic device 102, thus possibly leading to a charging interruption.

For example, when the power magnitude of the CEP signal is large, the recognition rate of the CEP signal in the external electronic device 102 may be increased, and thus wireless charging safety may be increased, while PCB vibration may be increased. In another example, when the power magnitude of the CEP signal is small, the PCB vibration may decrease, while the recognition rate of the CEP signal in the external electronic device 102 may decrease.

Figure 5A:
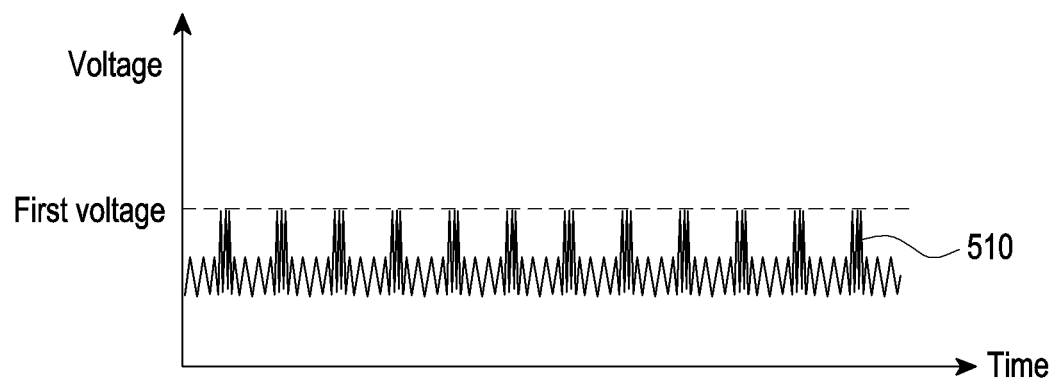
FIG. 5A is a diagram illustrating a CEP signal having a first power magnitude according to an embodiment of the disclosure.
Figure 5B:
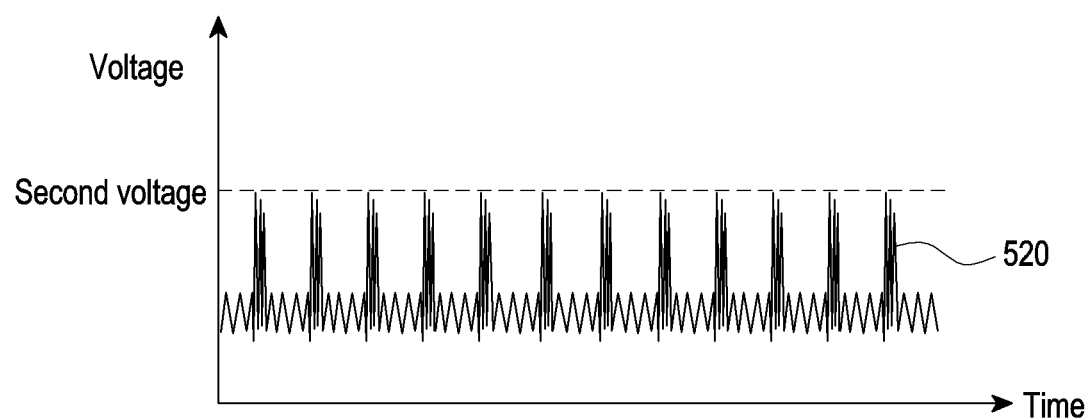
FIG. 5B is a diagram illustrating a CEP signal having a second power magnitude according to an embodiment of the disclosure.

FIG. 5A is a diagram illustrating a CEP signal having a first power magnitude according to an embodiment of the disclosure, and FIG. 5B is a diagram illustrating a CEP signal having a second power magnitude according to an embodiment of the disclosure.

Referring to FIG. 5A, when the magnitude of power received for charging is less than a specified power magnitude (e.g., 7.5 W), the electronic device 101 according to an embodiment may output (or transmit) a CEP signal 510 having a constant first power magnitude (or a predetermined first voltage level (e.g., 0.4V)).

Referring to FIG. 5B, when the magnitude of power received for charging is larger than the specified power magnitude (e.g., 7.5 W), the electronic device 101 according to an embodiment may output (or transmit) a CEP signal 520 having a second power magnitude (e.g., a second voltage level (e.g., about 0.8V)) larger than the first power magnitude.

As illustrated in FIG. 5A, the CEP signal 510 having the small first power magnitude may cause weak PCB vibration, whereas as illustrated in FIG. 5B, the CEP signal 520 having the second power magnitude greater than the first power magnitude may cause strong PCB vibration.

When the magnitude of power received for charging is equal to or greater than the specified power magnitude (e.g., 7.5 W), the electronic device 101 according to an embodiment may output (or transmit) a CEP signal having a variable power magnitude, so that PCB vibration is minimized without decreasing the recognition rate of the CEP signal.

Figure 6:
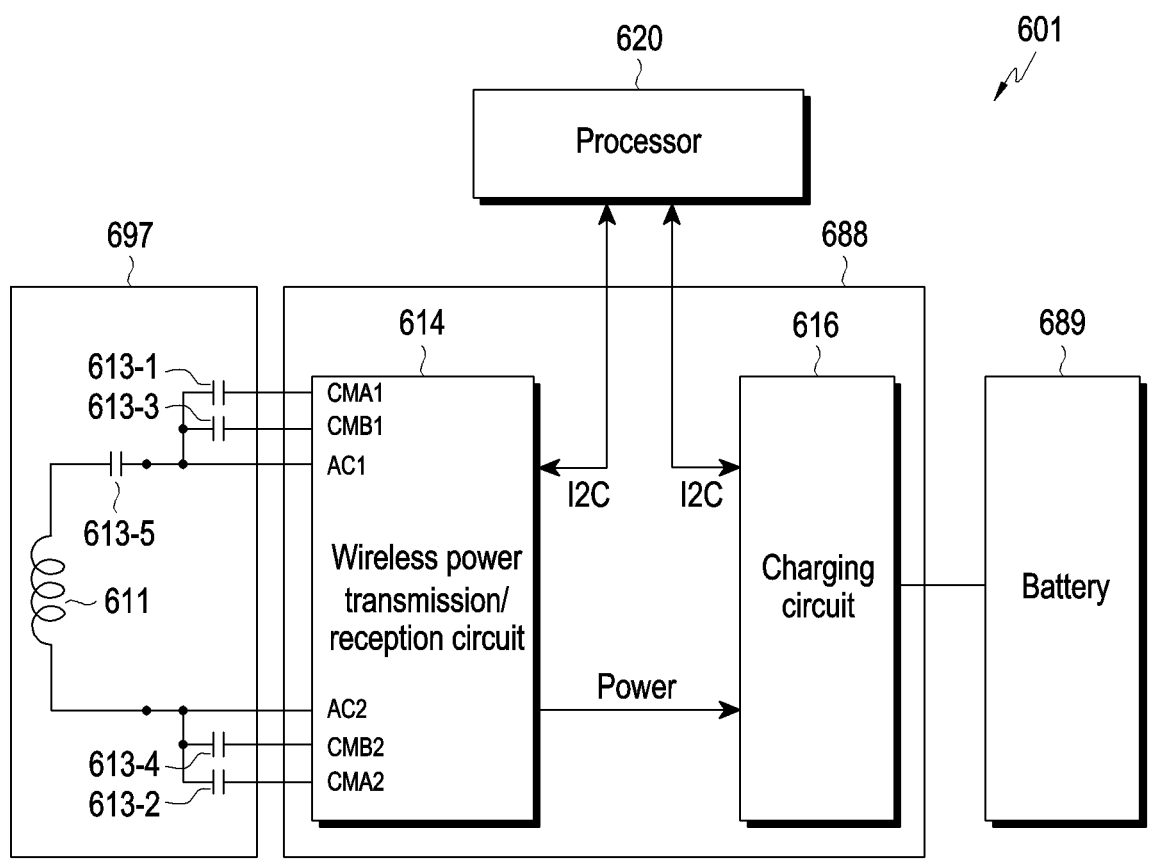
FIG. 6 is a block diagram illustrating an electronic device according to an embodiment of the disclosure.

FIG. 6 is a block diagram illustrating an electronic device according to an embodiment of the disclosure.

Referring to FIG. 6, an electronic device 601 (e.g., the electronic device 101 of FIG. 1) may include an antenna module 697 (e.g., the antenna module 197 of FIG. 1), a power management module 688 (e.g., the power management module 188 of FIG. 1), and a battery 689 (e.g., the battery 189 of FIG. 1).

The antenna module 697 according to an embodiment may include at least one coil 611 and capacitors (e.g., first to fifth capacitors 613-1 to 613-5). According to another embodiment of the disclosure, there may be more or fewer capacitors than the first to fifth capacitors 613-1 to 613-5. According to an embodiment of the disclosure, the at least one coil 611 may include a coil for wireless power transmission/reception (e.g., near field magnetic induction (NFMI)). The length (or the number of turns) of each of the at least one coil 611 according to an embodiment may be a length (or the number of turns) used for wireless power transmission. The at least one coil according to an embodiment may include one coil or a plurality of coils, or may be a plurality of coils connected in series or in parallel.

The capacitors (e.g., the first to fifth capacitors 613-1 to 613-5) according to an embodiment may be connected to the at least one coil 611. Each of at least a part (e.g., the first to fourth capacitors 613-1 to 613-4) of the capacitors according to an embodiment may be connected to the at least one coil 611 or a ground GND based on the control of a wireless power transmission/reception circuit 614. A wireless charging resonance point may be changed depending on whether each of the first to fourth capacitors 613-1 to 613-4 is connected to the at least one coil 611 or the ground, and an amplitude shift key (ASK)-type packet waveform may be generated. The power magnitude of the waveform may be determined according to the capacitance capacities and connection states of the first to fourth capacitors 613-1 to 613-4. The ASK-type packet waveform may be generated due to the power magnitude of the waveform. For example, the first to fourth capacitors 613-1 to 613-4 may have the same or different capacitance capacities. For example, in the case where the capacitance capacities of the first to fourth capacitors 613-1 to 613-4 are different, when a capacitor having a large capacitance value is connected to the at least one coil 611, the magnitude of current (e.g., alternating current (AC)) (or voltage or power) applied to the at least one coil 611 may be large, and when a capacitor having a small capacitance value is connected to the at least one coil 611, the magnitude of current (e.g., AC) (or voltage or power) applied to the at least one coil 611 may be small. Another part (e.g., the fifth capacitor 613-5) of the capacitors according to an embodiment may prevent (or remove) or reduce a parasitic signal (or current) during wireless power transmission and reception.

The power management module 688 according to an embodiment may include the wireless power transmission/reception circuit (e.g., a magnetic field control IC) 614 and a charging circuit (e.g., a charger IC) 616, and may further include another circuit related to power management in the electronic device 601.

The wireless power transmission/reception circuit 614 according to an embodiment may perform an operation of wirelessly receiving power or wirelessly transmitting power. The wireless power transmission/reception circuit 614 according to an embodiment may transmit a power control signal (e.g., a CEP signal) for power to be received from an external electronic device (e.g., the electronic device 102 of FIG. 1) (e.g., a wireless power transmission device), for wireless power reception, or perform operating frequency control and duty control based on a power control signal (e.g., a CEP signal) received from the external electronic device during wireless power transmission.

According to an embodiment of the disclosure, the wireless power transmission/reception circuit 614 may include at least one switch (e.g., a first switch CMA1, a second switch CMA2, a third switch CMB1, and/or a fourth switch CMB2, a wireless power reception circuit (not shown) for wireless power reception, and/or a wireless power transmission circuit (not shown) for wireless power transmission.

According to an embodiment of the disclosure, at least one switch (e.g., the first switch CMA1, the second switch CMA2, the third switch CMB1, and/or the fourth switch CMB2) of the wireless power transmission/reception circuit 614 may perform an on or off operation based on the control of a processor 620. For example, one end of each of the first switch CMA1, the second switch CMA2, the third switch CMB1, and/or the fourth switch CMB2 may be connected to one of the first to fourth capacitors 613-1 to 613-4, and the other end of the switch may be connected to a field effect transistor (FET) in the wireless power transmission/reception circuit 614.

The wireless power transmission/reception circuit 614 includes a processor therein. The processor inside the wireless power transmission/reception circuit 614 may be connected to an FET of the wireless power transmission/reception circuit 614. The processor inside the wireless power transmission/reception circuit 614 may turn on (or close) each of the first switch CMA1, the second switch CMA2, the third switch CMB1, and/or the fourth switch CMB2 through FET control, so that at least some or all of the first to fourth capacitors 613-1 to 613-4 are connected to the ground (e.g., GND) and thus to the at least one coil 611. The processor inside the wireless power transmission/reception circuit 614 may turn off (or open) each of the first switch CMA1, the second switch CMA2, the third switch CMB1, and/or the fourth switch CMB2, to control performing of an operation of not connecting at least some or any of the first to fourth capacitors 613-1 to 613-4 to the at least one coil 611.

At least some or all of the first to fourth capacitors 613-1 to 613-4 may or may not be connected to the at least one coil 611 based on the switch-on or off operation of each of the first switch CMA1, the second switch CMA2, the third switch CMB1, and the fourth switch CMB2 according to an embodiment. For example, when the first switch CMA1 is turned on, the at least one coil 611 may be connected to the first capacitor 613-1, and when the first switch CMA1 is turned off, the first capacitor 613-1 may not be connected to the at least one coil 611. For example, when the second switch CMA2 is turned on, the at least one coil 611 may be connected to the second capacitor 613-2, and when the second switch CMA2 is turned off, the at least one coil 611 may not be connected to the second capacitor 613-2. For example, when the third switch CMB1 is turned on, the at least one coil 611 may be connected to the third capacitor 613-3, and when the third switch CMB1 is turned off, the at least one coil 611 may not be connected to the third capacitor 613-3. For example, when the fourth switch CMB2 is turned on, the at least one coil 611 may be connected to the fourth capacitor 613-4, and when the fourth switch CMB2 is turned off, the at least one coil 611 may not be connected to the fourth capacitor 613-4.

According to an embodiment of the disclosure, the magnitude of current (AC) (or voltage or power) applied to the at least one coil 611 for output (or transmission) of a CEP signal may increase or decrease based on at least some or all of the first to fourth capacitors 613-1 to 613-4 being connected to the at least one coil 611 or based on at least some or any of the first to fourth capacitors 613-1 to 613-4 not being connected to the at least one coil 611. As the magnitude of the current (AC) (or voltage or power) applied to the at least one coil 611 increases or decreases, the magnitude of the power of the CEP signal output (or transmitted) through the at least one coil 611 may increase or decrease.

The wireless power reception circuit of the wireless power transmission/reception circuit 614 according to an embodiment may perform a power process, such as rectifying power of an AC waveform received through the at least one coil 611 to a direct current (DC) waveform, converting the voltage of the power, or regulating the power, and transmit the processed power to the charging circuit 616. For example, when transmitting wireless power, the wireless power transmission circuit may receive power from the charging circuit 616, generate an AC waveform for power transmission, generate a magnetic field through the at least one coil 611 based on the generated AC waveform, and transmit wireless power through the magnetic field.

The wireless power transmission circuit of the wireless power transmission/reception circuit 614 according to an embodiment may receive power from the charging circuit, generate a magnetic field through the at least one coil 611 based on the generated AC waveform, and transmit wireless power through the magnetic field.

The charging circuit 616 according to an embodiment may be connected between the wireless power transmission/reception circuit 614 and the battery 689. During wireless power reception, the charging circuit 616 according to an embodiment may charge the battery 689 with power received through the antenna module 697 and the wireless power transmission/reception circuit 614. During wireless power transmission, the charging circuit 616 according to an embodiment may output power from the battery 689 to the outside through the wireless power transmission/reception circuit 614 and the antenna module 697. For example, the wireless power transmission/reception circuit 614 may wirelessly transmit power to an external electronic device (e.g., an external wireless power reception device) by forming a magnetic field in the at least one coil 611 of the antenna module 697 using power received through the charging circuit 616. For example, the power from the battery 689 may be wirelessly shared with the external wireless power reception device. According to various embodiments of the disclosure, the external wireless power reception device may be one of various types of external electronic devices. For example, the various types of external electronic devices may include another electronic device (e.g., a smartphone) capable of interworking with the electronic device 601 or an accessory device (e.g., a smart watch, a wireless headset, or a wireless earphone) capable of interworking with the electronic device 601.

According to an embodiment of the disclosure, the processor 620 may include an AP or a CP. The processor 620 according to an embodiment may provide overall control to the operations of the electronic device 601. The processor 620 according to an embodiment may perform a control operation associated with wireless power transmission and reception. For example, the processor 620 may identify states (e.g., the ping phase, the identification & configuration phase, and/or the power transfer phase) associated with the wireless charging operation of the electronic device 601 and control the power management module 688 in correspondence with each state. For example, the processor 620 may transmit and receive information to and from the wireless power transmission/reception circuit 614 and/or the charging circuit 616 through communication with the wireless power transmission/reception circuit 614 and/or the charging circuit 616 in a specified communication (e.g., I2C communication) method, or control the operations of the wireless power transmission/reception circuit 614 and/or the charging circuit 616.

The processor 620 according to an embodiment may detect the external electronic device 102 and identify the magnitude of charging power to be received from (or transmitted by) the external electronic device 102 (or to be received at the electronic device 101) through the wireless power transmission/reception circuit 614. For example, the processor 620 may identify the magnitude of the charging power in the identification & configuration phase (e.g., 320) with the external electronic device 102. For example, the processor 620 may transmit information (e.g., a command) for identifying whether charging with a power magnitude equal to or greater than a specified power magnitude (e.g., 7.5 W) is available to the external electronic device 102, and the external electronic device 102 may or may not respond based on the reception of the information for identifying whether charging with a power magnitude equal to or greater than the specified power magnitude (e.g., 7.5 W) is available. When the processor 620 fails to receive a response from the external electronic device 102 or when a response received from the external electronic device 102 does not match a predetermined response, the processor 620 may identify the magnitude of charging power equal to or less than the specified power magnitude. Upon receipt of the predetermined response from the external electronic device 102, the processor may identify the magnitude of charging power equal to or greater than the specified power magnitude (e.g., 7.5 W).

According to an embodiment of the disclosure, the processor 620 may identify whether the magnitude of power to be received from the external electronic device 102 is equal to or greater than the specified power magnitude (e.g., about 7.5 W). When the magnitude of power to be received from the external electronic device 102 is less than the specified power magnitude, the processor 620 according to an embodiment may control the wireless power transmission/reception circuit 614 to output a first CEP signal having a constant first power magnitude. According to an embodiment of the disclosure, the processor 620 may provide a first control signal for outputting the first CEP signal having the constant first power magnitude to the wireless power transmission/reception circuit 614. For example, the first control signal may include a signal that controls turn-on of the first switch CMA1 and the second switch CMA2 and turn-off of the third switch CMB1 and the fourth switch CMB2. For example, the first capacitor 613-1 and the second capacitor 613-2 may be connected between the at least one coil 611 and the wireless power transmission/reception circuit 614, and the third capacitor 613-3 and the fourth capacitor 613-4 may not be connected between the at least one coil 611 and the wireless power transmission/reception circuit 614, during transmission of the CEP signal based on the first control signal. Therefore, the first CEP signal with the first power magnitude maintained constant (or fixed) may be output through the at least one coil 611.

When the magnitude of power to be received from the external electronic device 102 is equal to or greater than the specified power magnitude, the processor 620 according to an embodiment may control the wireless power transmission/reception circuit 614 to output a second CEP signal having a variable power magnitude based on the first power magnitude and a second power magnitude. For example, the second power magnitude may be greater than the first power magnitude. For example, the second CEP signal may be a signal alternating between the first power magnitude and the second power magnitude at specified intervals. According to an embodiment of the disclosure, the processor 620 may provide a second control signal for outputting the second CEP signal alternating between the first power magnitude and the second power magnitude at specified intervals to the wireless power transmission/reception circuit 614. For example, the second control signal may include a signal that controls turn-on of the first switch CMA1, the second switch CMA2, the third switch CMB1, and the fourth switch CMB2 during a first specified time (e.g., once), and then turn-on of the first switch CMA1 and the second switch CMA2 and turn-off of the third switch CMB1 and the fourth switch CMB2 during a second specified time (e.g., a plurality of times (e.g., three times, four times, five times, ten times, or any other number of times). For example, the at least one coil 611 may be connected to the first capacitor 613-1 to the fourth capacitor 613-4 during the first specified time, and the at least one coil 611 may be connected to the first capacitor 613-1 and the second capacitor 613-2 and may not be connected to the third capacitor 613-3 and the capacitor 413-4 during the second specified time after the first specified time, during transmission of the CEP signal based on the second control signal. Accordingly, the second CEP signal, which has the second power magnitude for the first specified time and the first power magnitude for the second specified time, and which varies its power magnitude so that a signal transmission of the second power magnitude and a signal transmission of the first power magnitude are repeated (or alternated) in a specified pattern, may be output through the at least one coil 611.

According to an embodiment of the disclosure, the processor 620 may output a second control signal that controls the presence of the first specified time with the second power magnitude at least twice during a CEP signal waiting time (e.g., 1.8 sec) of the external electronic device 102, and the CEP signal reception failure of the external electronic device 102 may be reduced in view of a waveform having the second power magnitude at least twice during the CEP signal waiting time of the external electronic device 102.

According to various embodiments of the disclosure, an electronic device (e.g., the electronic device 101 of FIG. 1 or the electronic device 601 of FIG. 6) may include a battery (e.g., the battery 289 of FIG. 1 or the battery 689 of FIG. 6), at least one coil (e.g., the at least one coil 611 of FIG. 6), a wireless power transmission/reception circuit (e.g., the wireless power transmission/reception circuit 614 of FIG. 6) electrically coupled to the at least one coil, a charging circuit (e.g., the charging circuit 210 of FIG. 2 or the charging circuit 616 of FIG. 6) electrically coupled between the wireless power transmission/reception circuit and the battery, and a processor (e.g., the processor 120 of FIG. 1 or the processor 620 of FIG. 6). The processor may be configured to detect an external electronic device capable of wireless power transmission by using the wireless power transmission/reception circuit, identify a magnitude of power to be received from the external electronic device, control the wireless power transmission/reception circuit to output a first control error packet (CEP) signal having a first power magnitude which is fixed, based on the magnitude of the power being less than a specified power magnitude, and control the wireless power transmission/reception circuit to output a second CEP signal having a variable power magnitude based on the first power magnitude and a second power magnitude, based on the magnitude of the power being equal to or greater than the specified power magnitude.

According to various embodiments of the disclosure, the second power magnitude may be greater than the first power magnitude.

According to various embodiments of the disclosure, the second CEP signal may include a signal which has the second power magnitude during a first specified time period and the first power magnitude during a second specified time period, and which alternates between the second power magnitude and the first power magnitude.

According to various embodiments of the disclosure, the second CEP signal may be a signal in which one transmission of a signal having the second power magnitude and a plurality of transmissions of a signal having the first power magnitude are repeated.

According to various embodiments of the disclosure, the signal having the second power magnitude may be configured to be transmitted at least twice during a CEP signal waiting time of the external electronic device.

According to various embodiments of the disclosure, the processor may be configured to identify whether a power transfer period of the electronic device is a CV period during the output of the second CEP signal, and when the power transfer period of the electronic device is a CV period during the output of the second CEP signal, control the wireless power transmission/reception circuit to output the first CEP signal having the first power magnitude.

According to various embodiments of the disclosure, the electronic device may further include a plurality of capacitors coupled to the at least one coil, and the wireless power transmission/reception circuit may be configured to output the first CEP signal or the second CEP signal by turning on or turning off at least some of a plurality of switches coupled to the plurality of capacitors, respectively, based on a control signal from the processor.

According to various embodiments of the disclosure, the plurality of capacitors may include a first capacitor, a second capacitor, a third capacitor, and a fourth capacitor, and the plurality of switches may include a first switch, a second switch, a third switch, and a fourth switch. The wireless power transmission/reception circuit may be configured to output the first CEP signal by turning on the first switch and the second switch and turning off the third switch and the fourth switch, based on a first control signal received from the processor. The wireless power transmission/reception circuit may be configured to output the second CEP signal by turning on the first switch, the second switch, the third switch, and the fourth switch during a first specified time period, and then turning on the first switch and the second switch and turning off the third switch and the fourth switch during a second specified time period, based on a second control signal received from the processor.

According to various embodiments of the disclosure, the plurality of capacitors may include a first capacitor, a second capacitor, a third capacitor, and a fourth capacitor, and the plurality of switches may include a first switch, a second switch, a third switch, and a fourth switch. The wireless power transmission/reception circuit may be configured to output the first CEP signal by turning on the first switch and the second switch and turning off the third switch and the fourth switch, based on a first control signal received from the processor. The wireless power transmission/reception circuit may be configured to output the second CEP signal by turning on the first switch, the second switch the third switch, and the fourth switch during a first specified time period, and then turning on the first switch and turning off the second switch, the third switch, and the fourth switch during a second specified time period, based on a second control signal received from the processor.

According to various embodiments of the disclosure, the wireless power transmission/reception circuit may include a magnetic field control integrated circuit (IC).

Figure 7:
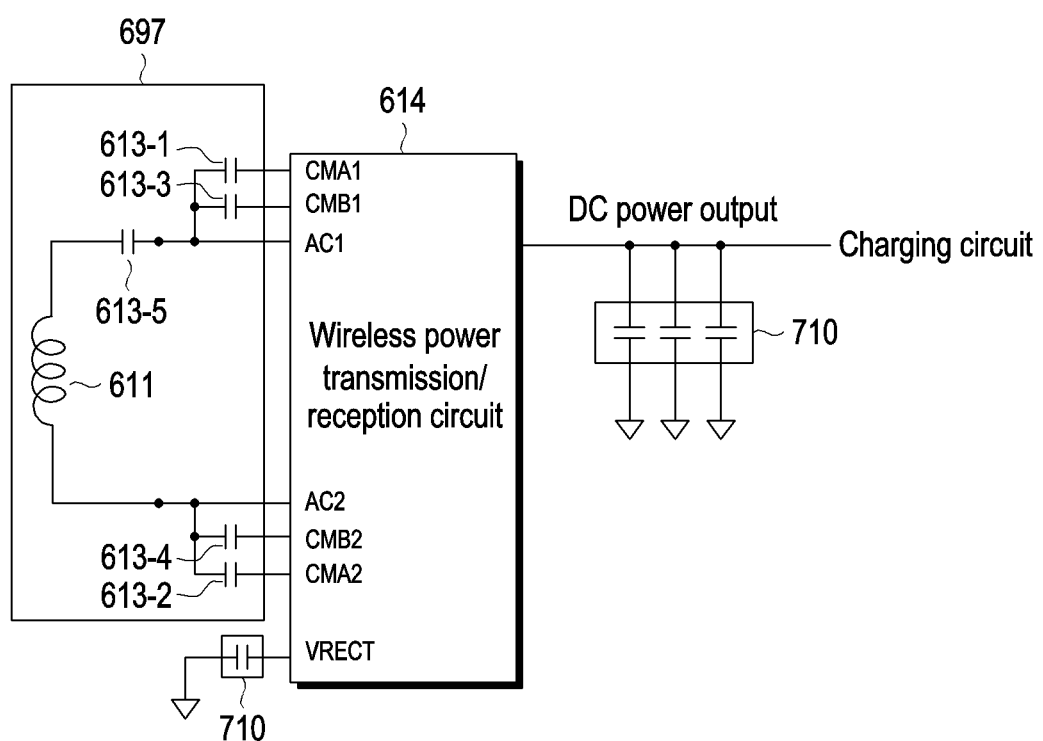
FIG. 7 is a diagram illustrating a wireless power transmission/reception circuit and an MLCC in an electronic device according to an embodiment of the disclosure.

FIG. 7 is a diagram illustrating a wireless power transmission/reception circuit and an MLCC in an electronic device according to an embodiment of the disclosure.

Referring to FIG. 7, an electronic device (e.g., the electronic device 101 of FIG. 1 or the electronic device 601 of FIG. 6) may include a plurality of MLCCs 710 connected to the wireless power transmission/reception circuit 614, and the plurality of MLCCs 710 may be arranged on a PCB (e.g., the PCB 410 of FIGS. 4A and 4B).

The wireless power transmission/reception circuit 614 according to an embodiment may turn on the first switch CMA1 and the second switch CMA2 and turn off the third switch CMB1 and the fourth switch CMB2 based on the first control signal from the processor 620, to output the first CEP signal with the first power magnitude (or first voltage level (e.g., about 0.4V)) maintained constant (fixed) through the at least one coil 611. Contraction and expansion of the plurality of MLCCs 710 caused by the first power magnitude may lead to weak PCB vibration.

The wireless power transmission/reception circuit 614 according to an embodiment may turn on the first switch CMA1, the second switch CMA2, the third switch CMB1, and the fourth switch CMB2 during the first specified time (e.g., once (one time unit)), and turn on the first switch CMA1 and the second switch CMA2 and turn off the third switch CMB1 and the fourth switch CMB2 or turn on the first switch CMA1 and turn off the second switch CMA2, the third switch CMB1, and the fourth switch CMB2 during the second specified time (e.g., a plurality of times (e.g., three times, four times, five times, ten times, or any other number of times), based on the second control signal from the processor 620 during transmission of the CEP signal, to output the second CEP signal having a repeated pattern of one transmission of a signal with the second power magnitude (or second voltage level (e.g., about 0.8V) and a plurality of times of transmissions of a signal with the first power magnitude less than the second power magnitude, through the at least one coil 611. The second CEP signal based on the second control signal according to an embodiment may reduce the number of signal transmissions of the second power magnitude, compared to the case of maintaining the second power magnitude fixedly. Therefore, the number of signals transmissions with the second power magnitude during the CEP signal waiting time (e.g., 1.8 sec) of the external electronic device 102 may be at least 2 without increasing the strength of PCB vibration, thereby reducing the CEP signal reception failure of the external electronic device 102.

According to various embodiments of the disclosure, a method of outputting a power control signal for wireless power reception in an electronic device (e.g., the electronic device 101 of FIG. 1 of the electronic device 601 of FIG. 6) may include detecting an external electronic device (e.g., the electronic device 102 of FIG. 1) capable of wireless power transmission by using a wireless power transmission/reception circuit, identifying a magnitude of power to be received from the external electronic device, outputting a first CEP signal having a first power magnitude which is fixed, based on the magnitude of the power being less than a specified power magnitude, and outputting a second CEP signal having a variable power magnitude based on the first power magnitude and the second power magnitude, based on the magnitude of the power being equal to or greater than the specified power magnitude.

According to various embodiments of the disclosure, the second power magnitude may be greater than the first power magnitude.

According to various embodiments of the disclosure, the second CEP signal may include a signal which has the second power magnitude during a first specified time period and the first power magnitude during a second specified time period, and which alternates between the second power magnitude and the first power magnitude.

According to various embodiments of the disclosure, the second CEP signal may be a signal in which one transmission of a signal having the second power magnitude and a plurality of transmissions of a signal having the first power magnitude are repeated.

According to various embodiments of the disclosure, the signal having the second power magnitude may be configured to be transmitted at least twice during a CEP signal waiting time of the external electronic device.

According to various embodiments of the disclosure, the method may further include identifying whether a power transfer period of the electronic device is a CV period during the output of the second CEP signal, and when the power transfer period of the electronic device is a CV period during the output of the second CEP signal, outputting the first CEP signal having the fixed first power magnitude.

According to various embodiments of the disclosure, the method may further include turning on or turning off at least some of a plurality of switches corresponding to the plurality of capacitors coupled to at least one coil of the electronic device, respectively, to output the first CEP signal or the second CEP signal.

According to various embodiments of the disclosure, when the plurality of capacitors include a first capacitor, a second capacitor, a third capacitor, and a fourth capacitor, and the plurality of switches include a first switch, a second switch, a third switch, and a fourth switch, the first switch and the second switch may be turned on and the third switch and the fourth switch may be turned off during the output of the first CEP signal, and turning on the first switch, the second switch, the third switch, and the fourth switch during a first specified time period and then turning on the first switch and the second switch and turning off the third switch and the fourth switch during a second specified time period may be repeated during the output of the second CEP signal.

According to various embodiments of the disclosure, when the plurality of capacitors include a first capacitor, a second capacitor, a third capacitor, and a fourth capacitor, and the plurality of switches include a first switch, a second switch, a third switch, and a fourth switch, the first switch and the second switch may be turned on and the third switch and the fourth switch may be turned off during the output of the first CEP signal, and turning on the first switch, the second switch, the third switch, and the fourth switch during a first specified time period and then turning on the first switch and turning off the second switch, the third switch, and the fourth switch during a second specified time period may be repeated during the output of the second CEP signal.

In other words, for transmission of the variable power (i.e. second) CEP signal that includes transmissions at the first and second power magnitudes, at least one additional switch is turned on to transmit the second (higher) power magnitude compared to transmission of the first (lower) power magnitude, or increased capacitance is connected to the coil for transmission of the higher power signal.

Figure 8:
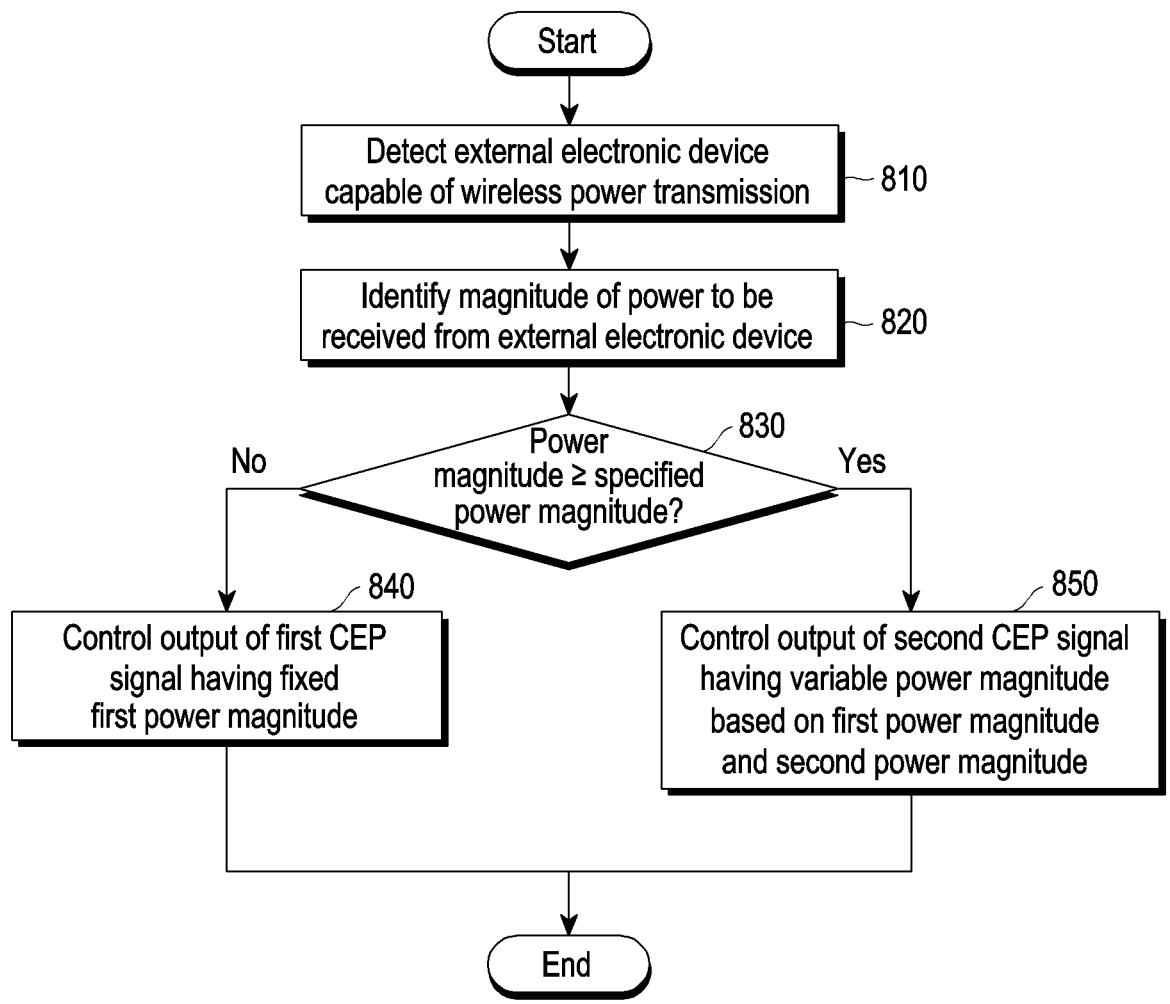
FIG. 8 is a flowchart illustrating an operation of outputting a power control signal for wireless power reception in an electronic device according to an embodiment of the disclosure.

FIG. 8 is a flowchart illustrating an operation of outputting a power control signal for wireless power reception in an electronic device according to an embodiment of the disclosure.

Referring to FIG. 8, a processor (e.g., the processor 120 of FIG. 1 or the processor 620 of FIG. 6) of an electronic device (e.g., the electronic device 101 of FIG. 1 or the electronic device 601 of FIG. 6) according to an embodiment may perform at least one of operation 810 to operation 850.

In operation 810, the processor 620 according to an embodiment may detect the external electronic device 102 capable of wireless power transmission through the wireless power transmission/reception circuit 614. For example, the processor 620 may identify the external electronic device 102 capable of providing wireless power based on reception of a ping signal from the external electronic device 102. The electronic device 101 may transmit an SSP signal through the wireless power transmission/reception circuit 614 in response to the received ping signal.

In operation 820, the processor 620 according to an embodiment may identify the magnitude of charging power to be received from (or transmitted by) the external electronic device 102 (or to be received at the electronic device 101). For example, the processor 620 may identify the magnitude of charging power to be received from (or transmitted by) the external electronic device 102 (or to be received at the electronic device 101) based on a predetermined charging power magnitude or a normal charging mode or a fast charging mode.

In operation 830, the processor 620 according to an embodiment may identify whether the magnitude of power to be received from the external electronic device 102 is equal to or greater than a specified power magnitude (e.g., about 7.5 W).

In operation 840, when the magnitude of power to be received from the external electronic device 102 is not equal to or greater than (or is less than) the specified power magnitude, the processor 620 according to an embodiment may control the wireless power transmitting/receiving circuit 614 to output a first CEP signal having a fixed first power magnitude (or a first voltage level (e.g., about 0.4V)). According to an embodiment of the disclosure, the processor 620 may provide a first control signal for outputting the first CEP signal having the constant first power magnitude to the wireless power transmission/reception circuit 614. For example, the first control signal may include a signal that controls turn-on of a part (the first switch CMA1 and the second switch CMA2) of switches (e.g., the first switch CMA1, the second switch CMA2, the third switch CMB1, and the fourth switch CMB2) connected to capacitors (e.g., the first to fourth capacitors 613-1 to 613-4) and turn-off of another part (e.g., the third switch CMB1 and the fourth switch CMB2) of the switches. For example, the first capacitor 613-1 and the second capacitor 613-2 may be connected to the at least one coil 611 and the third capacitor 613-3 and the fourth capacitor 613-4 may not be connected to the at least one coil 611, during transmission of the CEP signal based on the first control signal. Therefore, the first CEP signal with the first power magnitude maintained constant (or fixed) may be output through the at least one coil 611. For example, the wireless power transmission/reception circuit 614 may allow the first CEP signal to be output through the at least one coil 611 until another control signal is received after receiving the first control signal.

In operation 850, when the magnitude of power to be received from the external electronic device 102 is equal to or greater than the specified power magnitude, the processor 620 according to an embodiment may control the wireless power transmission/reception circuit 614 to output a second CEP signal alternating between the first power magnitude and a second power magnitude (or second voltage level (e.g., about 0.8V)) at specified intervals. For example, the second power magnitude may be greater than the first power magnitude. According to an embodiment of the disclosure, the processor 620 may provide a second control signal for outputting the second CEP signal alternating between the first power magnitude and the second power magnitude at the specified intervals to the wireless power transmission/reception circuit 614. For example, the second control signal may include a signal that controls turn-on of the first switch CMA1, the second switch CMA2, the third switch CMB1, and the fourth switch CMB2 during a first specified time (e.g., once), and then turn-on of the first switch CMA1 and the second switch CMA2 and turn-off of the third switch CMB1 and the fourth switch CMB2 or turn-on of the first switch CMA1 and turn-off of the second switch CMA2, the third switch CMB1, and the fourth switch CMB2 during a second specified time (e.g., a plurality of times (e.g., three times, four times, five times, ten times, or any other number of times). For example, the at least one coil 611 may be connected to the first capacitor 613-1 to the fourth capacitor 613-4 during the first specified time, and the at least one coil 611 may be connected to the first capacitor 613-1 and the second capacitor 613-2 and may not be connected to the third capacitor 613-3 and the capacitor 413-4 or may be connected to the first capacitor 613-1 and may not be connected to the second capacitor 613-2, the third capacitor 613-3, and the capacitor 413-4 during the second specified time after the first specified time, based on the second control signal during transmission of the CEP signal. Accordingly, the second CEP signal, which has the second power magnitude for the first specified time and the first power magnitude for the second specified time, and which varies its power magnitude so that a signal transmission of the second power magnitude and a signal transmission of the first power magnitude are repeated (or alternated) in a specified pattern, may be output through the at least one coil 611. For example, the wireless power transmission/reception circuit 614 may allow the second CEP signal to be output through the at least one coil 611 until another control signal is received after receiving the second control signal.

According to an embodiment of the disclosure, the processor 620 may output a second control signal such that the number of signal transmissions of the second power magnitude during the CEP signal waiting time (e.g., 1.8 sec) of the external electronic device 102 is at least 2. According to an embodiment of the disclosure, the CEP signal reception failure of the external electronic device 102 may be reduced in view of a waveform having the second power magnitude at least twice during the CEP signal waiting time of the external electronic device 102.

Figure 9:
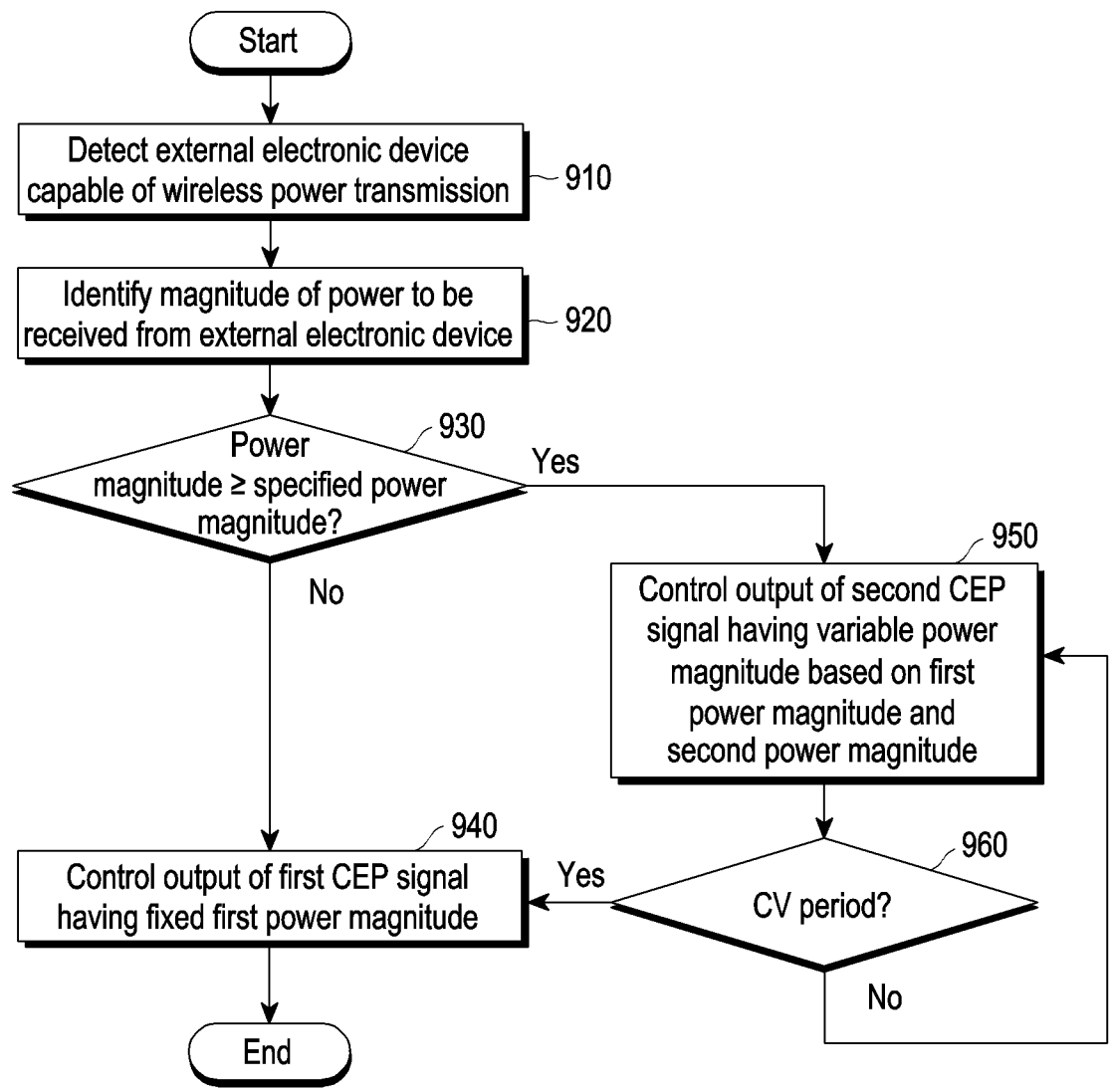
FIG. 9 is a flowchart illustrating an operation based on identification of whether a power transfer period is a constant voltage (CV) period, when a power control signal for wireless power reception is output in an electronic device according to an embodiment of the disclosure.

FIG. 9 is a flowchart illustrating an operation based on identification of whether a power transfer period is a constant voltage (CV) period, when a power control signal for wireless power reception is output in an electronic device according to an embodiment of the disclosure.

Referring to FIG. 9, a processor (e.g., the processor 120 of FIG. 1 or the processor 620 of FIG. 6) of an electronic device (e.g., the electronic device 101 of FIG. 1 or the electronic device 601 of FIG. 6) according to an embodiment may perform at least one of operation 910 to operation 960.

In operation 910, the processor 620 according to an embodiment may detect the external electronic device 102 capable of wireless power transmission through the wireless power transmission/reception circuit 614. For example, the processor 620 may identify the external electronic device 102 capable of providing wireless power based on reception of a ping signal from the external electronic device 102. The electronic device 101 may transmit an SSP signal through the wireless power transmission/reception circuit 614 in response to the received ping signal.

In operation 920, the processor 620 according to an embodiment may identify the magnitude of charging power to be received from (or transmitted by) the external electronic device 102 (or to be received at the electronic device 101). For example, the processor 620 may identify the magnitude of charging power to be received from (or transmitted by) the external electronic device 102 (or to be received at the electronic device 101) based on a predetermined charging power magnitude or a normal charging mode or a fast charging mode.

In operation 930, the processor 620 according to an embodiment may identify whether the magnitude of power to be received from the external electronic device 102 is equal to or greater than a specified power magnitude (e.g., about 7.5 W). When the magnitude of power to be received from the external electronic device 102 is not equal to or greater than (or is less than) the specified power magnitude, the processor 620 according to an embodiment may perform operation 940.

In operation 940, the processor 620 according to an embodiment may control the wireless power transmitting/receiving circuit 614 to output a first CEP signal having a fixed first power magnitude (or a first voltage level (e.g., about 0.4V)). According to an embodiment of the disclosure, the processor 620 may provide a first control signal for outputting the first CEP signal having the constant first power magnitude to the wireless power transmission/reception circuit 614. For example, the first control signal may include a signal that controls turn-on of a part (the first switch CMA1 and the second switch CMA2) of switches (e.g., the first switch CMA1, the second switch CMA2, the third switch CMB1, and the fourth switch CMB2) connected to capacitors (e.g., the first to fourth capacitors 613-1 to 613-4) and turn-off of another part (e.g., the third switch CMB1 and the fourth switch CMB2) of the switches. For example, the first capacitor 613-1 and the second capacitor 613-2 may be connected to the at least one coil 611 and the third capacitor 613-3 and the fourth capacitor 613-4 may not be connected to the at least one coil 611, during transmission of the CEP signal based on the first control signal. Therefore, the first CEP signal with the first power magnitude maintained constant (or fixed) may be output through the at least one coil 611. When the magnitude of power to be received from the external electronic device 102 is equal to or greater than the specified power magnitude, the processor 620 according to an embodiment may perform operation 950.

In operation 950, the processor 620 according to an embodiment may control the wireless power transmission/reception circuit 614 to output a second CEP signal alternating between the first power magnitude and a second power magnitude (or second voltage level (e.g., about 0.8V)) at specified intervals. For example, the second power magnitude may be greater than the first power magnitude. According to an embodiment of the disclosure, the processor 620 may provide a second control signal for outputting the second CEP signal alternating between the first power magnitude and the second power magnitude at the specified intervals to the wireless power transmission/reception circuit 614. For example, the second control signal may include a signal that controls turn-on of the first switch CMA1, the second switch CMA2, the third switch CMB1, and the fourth switch CMB2 during a first specified time (e.g., once), and then turn-on of the first switch CMA1 and the second switch CMA2 and turn-off of the third switch CMB1 and the fourth switch CMB2 or turn-on of the first switch CMA1 and turn-off of the second switch CMA2, the third switch CMB1, and the fourth switch CMB2 during a second specified time (e.g., a plurality of times (e.g., three times, four times, five times, ten times, or any other number of times). For example, the at least one coil 611 may be connected to the first capacitor 613-1 to the fourth capacitor 613-4 during the first specified time, and the at least one coil 611 may be connected to the first capacitor 613-1 and the second capacitor 613-2 and may not be connected to the third capacitor 613-3 and the capacitor 413-4 or may be connected to the first capacitor 613-1 and may not be connected to the second capacitor 613-2, the third capacitor 613-3, and the capacitor 413-4 during the second specified time after the first specified time, based on the second control signal during transmission of the CEP signal. Accordingly, the second CEP signal, which has the second power magnitude for the first specified time and the first power magnitude for the second specified time, and which varies its power magnitude in a pattern in which a signal transmission of the second power magnitude and a signal transmission of the first power magnitude are repeated (or alternated), may be output through the at least one coil 611.

In operation 960, the processor 620 according to an embodiment may identify whether a power transfer period is a CV period during the output of the second CEP signal. For example, the CV period may be a period in which the charge amount of the battery 689 is equal to or greater than a specified charge amount (e.g., 85% or more). In a period in which the charge amount of the battery 689 is 85% or more, the magnitude of power provided from the external electronic device 102 may be highly likely to be decreased to or below the specified power magnitude. When the power transmission phase is in a CV period during the output of the second CEP signal, the processor 620 according to an embodiment may perform operation 940. When the power transfer phase is not in a CV period during the output of the second CEP signal, the processor 620 according to an embodiment may continue to perform operation 950.

Figure 10A:
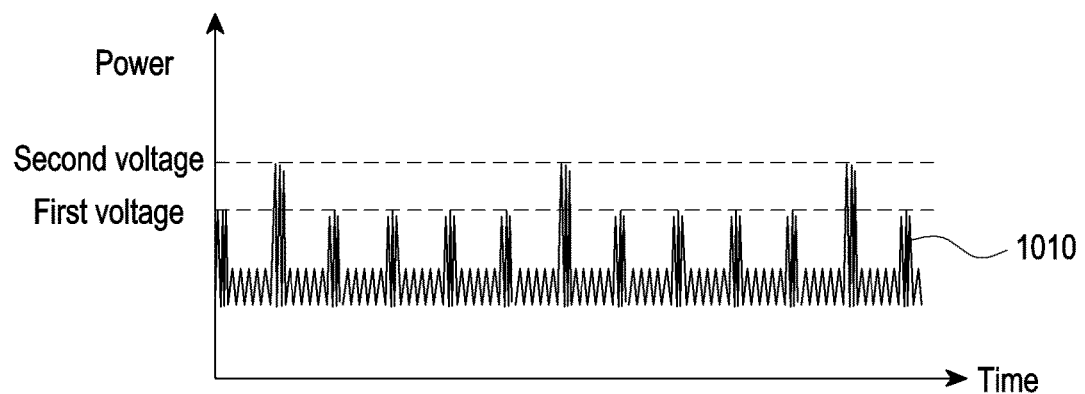
FIG. 10A is a diagram illustrating a second CEP signal in which one transmission of a second power magnitude and four transmissions of a first power magnitude are repeated according to an embodiment of the disclosure.
Figure 10B:
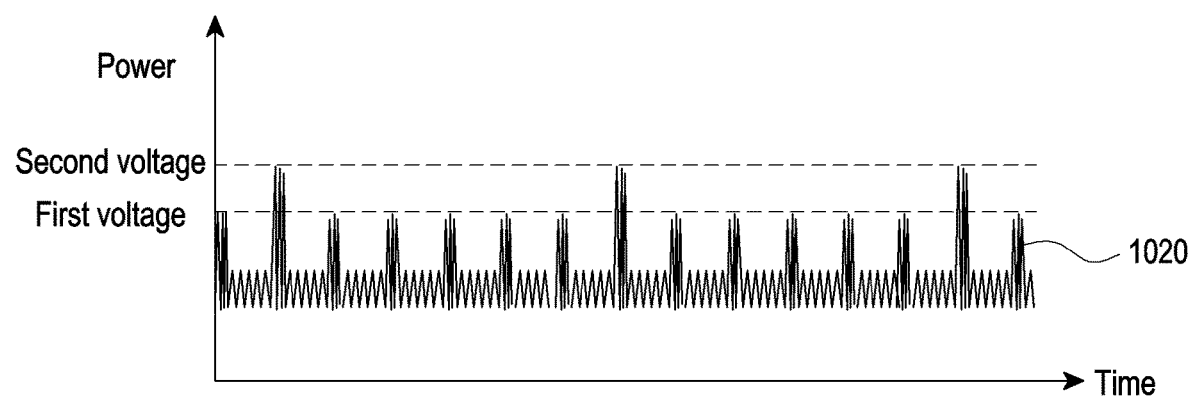
FIG. 10B is a diagram illustrating a second CEP signal in which one transmission of a second power magnitude and five transmissions of a first power magnitude are repeated according to an embodiment of the disclosure.

FIG. 10A is a diagram illustrating a second CEP signal in which one transmission of a second power magnitude and four transmissions of a first power magnitude are repeated according to an embodiment of the disclosure. FIG. 10B is a diagram illustrating a second CEP signal in which one transmission of a second power magnitude and five transmissions of a first power magnitude are repeated according to an embodiment of the disclosure.

Referring to FIG. 10A, when the magnitude of power received for charging is equal to or greater than to a specified power magnitude (e.g., 7.5 W), the processor 620 according to an embodiment may provide the wireless power transmission/reception circuit 612 with a second control signal that turns on the first switch CMA1, the second switch CMA2, the third switch CMB1, and the fourth switch CMB2 during a first specified time period (e.g., once), and turns on the first switch CMA1 and turns off the second switch CMA2, the third switch CMB1, and the fourth switch CMB2 during a second specified time period (e.g., four times). The wireless power transmission/reception circuit 612 may turn on the first switch CMA1, the second switch CMA2, the third switch CMB1, and the fourth switch CMB2 during the first specified time period (e.g., once), and turn on the first switch CMA1 and turn off the second switch CMA2, the third switch CMB1, and the fourth switch CMB2 during the second specified time period (e.g., four times), based on the second control signal, to output a second CEP signal 1010 which has a second power (or second voltage (e.g., about 0.8V) during the first specified time period (e.g., once) and a first power (or first voltage (e.g., about 0.4V) during the second specified time period (e.g., four times) and repeatedly alternates between the first specified time period and the second specified time period.

Referring to FIG. 10B, when the magnitude of power received for charging is equal to or greater than to a specified power magnitude (e.g., 7.5 W), the processor 620 according to an embodiment may provide the wireless power transmission/reception circuit 612 with a second control signal that turns on the first switch CMA1, the second switch CMA2, the third switch CMB1, and the fourth switch CMB2 during a first specified time period (e.g., once), and turns on the first switch CMA1 and turns off the second switch CMA2, the third switch CMB1, and the fourth switch CMB2 during a second specified time period (e.g., five times). The wireless power transmission/reception circuit 612 may turn on the first switch CMA1, the second switch CMA2, the third switch CMB1, and the fourth switch CMB2 during the first specified time period (e.g., once), and turn on the first switch CMA1 and turn off the second switch CMA2, the third switch CMB1, and the fourth switch CMB2 during the second specified time period (e.g., four times), based on the second control signal, to output a second CEP signal 1020 which has a second power (or second voltage (e.g., about 0.8V) during the first specified time period (e.g., once) and a first power (or first voltage (e.g., about 0.4V) during the second specified time period (e.g., five times) and repeatedly alternates between the first specified time period and the second specified time period.

In other words, according to an embodiment, the CEP signal includes a periodic transmission of either a first power or voltage (e.g. 0.4V) or a second power or voltage (e.g. 0.8V). When the power to be received for charging is less than a specified power magnitude, the periodic transmission is fixed at the first power. When the power to be received for charging is equal to or greater than the specified power magnitude, the periodic transmission varies between the first power and the second power, with a predetermined number of transmissions at the first power (4 in FIG. 10A and 5 in FIG. 10B) being made for each transmission at the second power. This means that high current charging and discharging of a capacitor happens less frequently than if the periodic transmission was always at the second power when the power to be received for charging is equal to or greater than the specified power magnitude. In turn this means that a lower level of vibration and therefore noise occurs according to this embodiment compared to when the periodic transmission is always at the second power. Furthermore, by ensuring that transmission at the second power occurs at least twice during a CEP signal waiting time, significant increases to interruptions to the charging process can be avoided.

According to an embodiment of the disclosure, an interval between peak powers (e.g., the first power or the second power) on a CEP signal (e.g., the first CEP signal or the second CEP signal) may be set based on the CEP value of a previous CEP signal. For example, when the CEP value of the previous CEP signal is within ±5%, the interval between peak powers (e.g., the first power or the second power) on the CEP signal (e.g., the first CEP signal or the second CEP signal) may be 150 ms, and when the CEP value of the previous CEP signal is equal to or greater than ±5%, the interval between peak powers (e.g., the first power or the second power) on the CEP signal (e.g., the first CEP signal or the second CEP signal) may be 55 ms.

According to an embodiment of the disclosure, the processor 620 may output the second control signal such that the number of signal transmissions of the second power magnitude exists at least twice during the CEP signal waiting time (e.g., 1.8 sec) of the external electronic device 102. According to an embodiment of the disclosure, the CEP signal reception failure of the external electronic device 102 may be reduced in view of a waveform having the second power magnitude at least twice during the CEP signal waiting time of the external electronic device 102.

Figure 11:
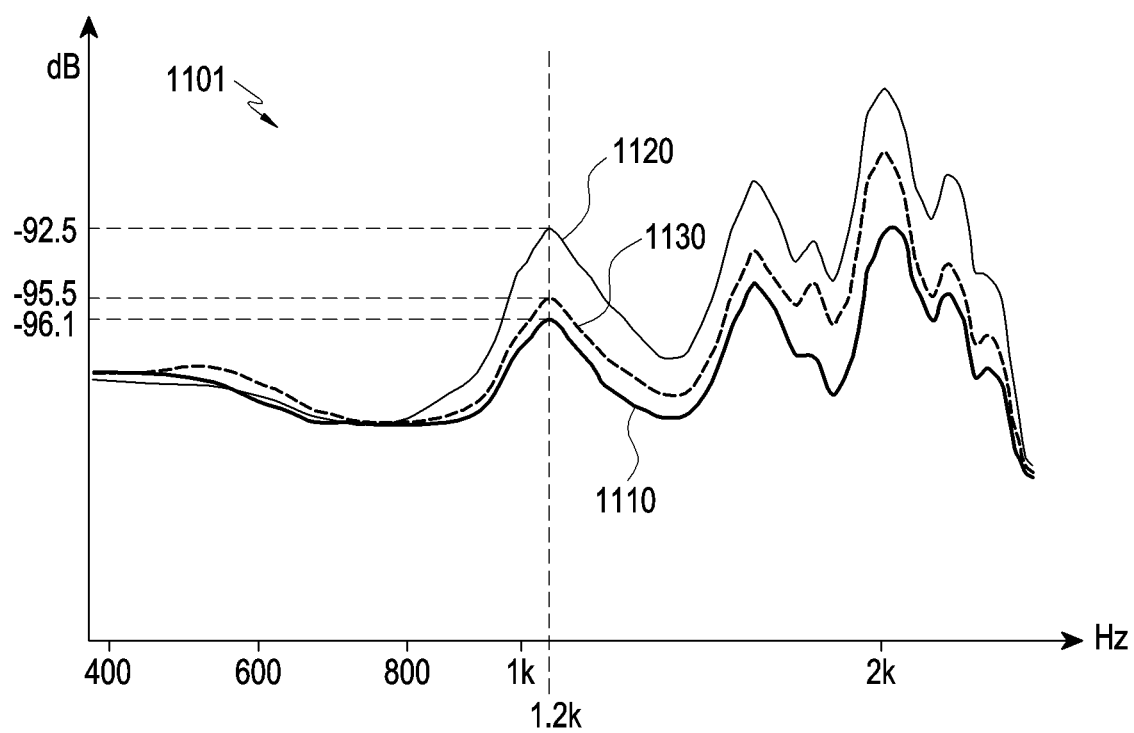
FIG. 11 is a diagram illustrating noise measurement results during wireless charging according to an embodiment of the disclosure.

FIG. 11 is a diagram illustrating noise measurement results during wireless charging according to an embodiment of the disclosure.

Referring to FIG. 11, in a noise measurement graph 1101 according to an embodiment of the disclosure, the horizontal axis may represent frequency Hz and the vertical axis may represent dB. A first noise measurement curve 1110 according to an embodiment may illustrate noise measured under a first condition in which with the first switch CMA1 and the second switch CMA2 turned on and the third switch CMB1 and the fourth switch CMB2 turned off, a CEP signal having a fixed first power magnitude (or first voltage level (e.g., about 0.4V)) is output. A second noise measurement graph 1120 according to an embodiment may illustrate noise measured under a second condition in which with all of the first switch CMA1, the second switch CMA2, the third switch CMB1, and the fourth switch CMB2 turned on, a CEP signal having a constant second power magnitude (or second voltage level (e.g., about 0.8V)) is output. A third noise measurement graph 1130 according to an embodiment may illustrate noise measured under a third condition in which in the state where the first switch CMA1, the second switch CMA2, the third switch CMB1, and the fourth switch CMB2 are turned on during a first specified time period (e.g., once), and the first switch CMA1 and the second switch CMA2 are turned and the third switch CMB1 and the fourth switch CMB2 turned out during a second specified time period (e.g., four times), a CEP signal alternating between the second power magnitude (or second voltage level (e.g., about 0.8V)) and the first power magnitude (or first voltage level (e.g., about 0.4V)) is output.

Referring to first to third noise measurement curves 1110 to 1130 according to an embodiment of the disclosure, noise may be measured as −96.1 dB at 1.2 KHz on the first noise measurement curve 1110, noise may be measured as −92.5 dB at 1.2 KHz on the second noise measurement curve 1120, and noise may be measured as 95.5 dB at 1.2 KHz on the third noise measurement curve 1130. It may be noted from these measurement results that less noise is generated when the magnitude of power is variable (e.g., the third condition) than when the magnitude of power is fixed (e.g., the second condition).

According to an embodiment of the disclosure, when the magnitude of power for charging received from the external electronic device 102 is equal to or greater than a specified power magnitude (e.g., 7.5 W, 10 W, 12 W, or any other power magnitude), it may be identified whether charging is interrupted under each of the first, second, and third conditions.

Table 1 below may be a table listing numbers of charge interruptions, when the magnitude of power received for charging from the external electronic device 102 is 12 W, and wireless charging is performed five times under each of the first, second, and third conditions.

TABLE 1

|  | $1^{st}$ time | $2^{nd}$ time | $3^{rd}$ time | $4^{th}$ time | $5^{th}$ time | Number of charge interruptions |
|---|---|---|---|---|---|---|
| First condition | 4 | 14 | 7 | 7 | 2 | 34 |
| Second condition | 0 | 0 | 2 | 2 | 0 | 4 |
| Third condition | 3 | 0 | 0 | 2 | 5 | 5 |

As noted from the results of identifying the numbers of charge interruptions in Table 1, when the magnitude of power received for charging is 12 W, a relatively large number of charge interruptions occur in the case of a fixed low power magnitude for the CEP signal (e.g., the first condition), and the number of charge interruptions is not very different between the case of a variable power magnitude for the CEP signal (e.g., the third condition) and the case of a fixed high power magnitude for the CEP signal (e.g., the second condition). While, the above description has been given in the context of the magnitude of power received for charging being 12 W according to an embodiment by way of example, even when the magnitude of power received for charging is 7.5 W, 10 W, or any other value, and wireless charging is performed a plurality of times under the first condition, the second condition, and the third condition, the number of charge interruptions may not be very different from in the case where the output power magnitude of a CEP signal is fixed to a high power magnitude (e.g., the second condition). The identified noise and the identified number of charge interruptions according to the above-described embodiment reveal that the electronic device 101 may reduce noise and prevent an increase in charge interruptions by using a CEP signal having a variable power magnitude, when the magnitude of power received for charging is equal to or greater than a specified power magnitude (e.g., 7.5 W).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

According to various embodiments of the disclosure, a non-volatile storage medium may store instructions which are configured to, when executed by at least one processor, cause the at least one processor to perform at least one operation. The at least one operation may include detecting an external electronic device capable of wireless power transmission by using a wireless power transmission/reception circuit, identifying a magnitude of power to be received from the external electronic device, outputting a first CEP signal having a first power magnitude which is fixed, based on the magnitude of the power being less than a specified power magnitude, and outputting a second CEP signal having a variable power magnitude based on the first power magnitude and the second power magnitude, based on the magnitude of the power being equal to or greater than the specified power magnitude.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a battery;
at least one coil;
a wireless power transmission/reception circuit electrically coupled to the at least one coil;
a charging circuit electrically coupled between the wireless power transmission/reception circuit and the battery; and
a processor,
wherein the processor is configured to:
 detect an external electronic device capable of wireless power transmission by using the wireless power transmission/reception circuit,
 identify a magnitude of power to be received from the external electronic device,
 control the wireless power transmission/reception circuit to output a first control error packet (CEP) signal having a first power magnitude which is fixed, based on the magnitude of the power being less than a specified power magnitude, and
 control the wireless power transmission/reception circuit to output a second CEP signal having a variable power magnitude based on the first power magnitude and a second power magnitude, based on the magnitude of the power being equal to or greater than the specified power magnitude.

2. The electronic device of claim 1, wherein the second power magnitude is greater than the first power magnitude.

3. The electronic device of claim 1, wherein the second CEP signal includes a signal which has the second power magnitude during a first specified time period and the first power magnitude during a second specified time period, and which alternates between the second power magnitude and the first power magnitude.

4. The electronic device of claim 1, wherein the second CEP signal is a signal in which one transmission of a signal having the second power magnitude and a plurality of transmissions of a signal having the first power magnitude are repeated.

5. The electronic device of claim 4, wherein the signal having the second power magnitude is configured to be transmitted at least twice during a CEP signal waiting time of the external electronic device.

6. The electronic device of claim 1, wherein the processor is configured to:
identify whether a power transfer period of the electronic device is a constant voltage (CV) period during the output of the second CEP signal, and
when the power transfer period of the electronic device is a CV period during the output of the second CEP signal, control the wireless power transmission/reception circuit to output the first CEP signal having the first power magnitude.

7. The electronic device of claim 1, further comprising:
a plurality of capacitors coupled to the at least one coil, wherein the wireless power transmission/reception circuit is configured to output the first CEP signal or the second CEP signal by turning on or turning off at least some of a plurality of switches coupled to the plurality of capacitors, respectively, based on a control signal from the processor.

8. The electronic device of claim 7,
wherein the plurality of capacitors includes a first capacitor, a second capacitor, a third capacitor, and a fourth capacitor,
wherein the plurality of switches includes a first switch, a second switch, a third switch, and a fourth switch,
wherein the wireless power transmission/reception circuit is configured to output the first CEP signal by turning on the first switch and the second switch and turning off the third switch and the fourth switch, based on a first control signal received from the processor, and
wherein the wireless power transmission/reception circuit is configured to output the second CEP signal by turning on the first switch, the second switch, the third switch, and the fourth switch during a first specified time period, and then turning on the first switch and the second switch and turning off the third switch and the fourth switch during a second specified time period, based on a second control signal received from the processor.

9. The electronic device of claim 7,
wherein the plurality of capacitors includes a first capacitor, a second capacitor, a third capacitor, and a fourth capacitor,
wherein the plurality of switches includes a first switch, a second switch, a third switch, and a fourth switch,
wherein the wireless power transmission/reception circuit is configured to output the first CEP signal by turning on the first switch and the second switch and turning off the third switch and the fourth switch, based on a first control signal received from the processor, and
wherein the wireless power transmission/reception circuit is configured to output the second CEP signal by turning on the first switch, the second switch, the third switch, and the fourth switch during a first specified time period, and then turning on the first switch and turning off the second switch, the third switch, and the fourth switch during a second specified time period, based on a second control signal received from the processor.

10. The electronic device of claim 1, wherein the wireless power transmission/reception circuit includes a magnetic field control integrated circuit (IC).

11. A method of outputting a power control signal for wireless power reception in an electronic device, the method comprising:
detecting an external electronic device capable of wireless power transmission by using a wireless power transmission/reception circuit;
identifying a magnitude of power to be received from the external electronic device;
based on the magnitude of the power being less than a specified power magnitude, outputting a first control error packet (CEP) signal having a first power magnitude which is fixed; and
based on the magnitude of the power being equal to or greater than the specified power magnitude, outputting a second CEP signal having a variable power magnitude based on the first power magnitude and a second power magnitude.

12. The method of claim 11, wherein the second power magnitude is greater than the first power magnitude.

13. The method of claim 11, wherein the second CEP signal includes a signal which has the second power magnitude during a first specified time period and the first power magnitude during a second specified time period, and which alternates between the second power magnitude and the first power magnitude.

14. The method of claim 11, wherein the second CEP signal is a signal in which one transmission of a signal having the second power magnitude and a plurality of transmissions of a signal having the first power magnitude are repeated.

15. The method of claim 14, wherein the signal having the second power magnitude is configured to be transmitted at least twice during a CEP signal waiting time of the external electronic device.

16. The method of claim 11, further comprising:
identifying whether a power transfer period of the electronic device is a constant voltage (CV) period during the output of the second CEP signal; and
when the power transfer period of the electronic device is a CV period during the output of the second CEP signal, outputting the first CEP signal having the first power magnitude.

17. The method of claim 11, further comprising turning on or turning off at least some of a plurality of switches corresponding to a plurality of capacitors coupled to at least one coil of the electronic device, respectively, to output the first CEP signal or the second CEP signal.

18. The method of claim 17, wherein, when the plurality of capacitors includes a first capacitor, a second capacitor, a third capacitor, and a fourth capacitor, and the plurality of switches includes a first switch, a second switch, a third switch, and a fourth switch, the first switch and the second switch are turned on and the third switch and the fourth switch are turned off during the output of the first CEP signal, and turning on the first switch, the second switch, the third switch, and the fourth switch during a first specified time period and then turning on the first switch and the second switch and turning off the third switch and the fourth switch during a second specified time period are repeated during the output of the second CEP signal.

19. The method of claim 17, wherein when the plurality of capacitors includes a first capacitor, a second capacitor, a third capacitor, and a fourth capacitor, and the plurality of switches includes a first switch, a second switch, a third switch, and a fourth switch, the first switch and the second switch are turned on and the third switch and the fourth switch are turned off during the output of the first CEP signal, and turning on the first switch, the second switch, the third switch, and the fourth switch during a first specified time period and then turning on the first switch and turning off the second switch, the third switch, and the fourth switch during a second specified time period are repeated during the output of the second CEP signal.

20. At least one non-transitory storage medium storing instructions which are configured to, when executed by at least one processor, cause the at least one processor to perform at least one operation, wherein the at least one operation includes:
   detecting an external electronic device capable of wireless power transmission by using a wireless power transmission/reception circuit, identifying a magnitude of power to be received from the external electronic device, based on the magnitude of the power being less than a specified power magnitude, outputting a first control error packet (CEP) signal having a first power magnitude which is fixed, and
   based on the magnitude of the power being equal to or greater than the specified power magnitude, outputting a second CEP signal having a variable power magnitude based on the first power magnitude and a second power magnitude.

* * * * *